No. 628,979. Patented July 18, 1899.
G. EYER, Jr.
TILTING SEAT FOR VEHICLES.
(Application filed Mar. 4, 1899.)
(No Model.)
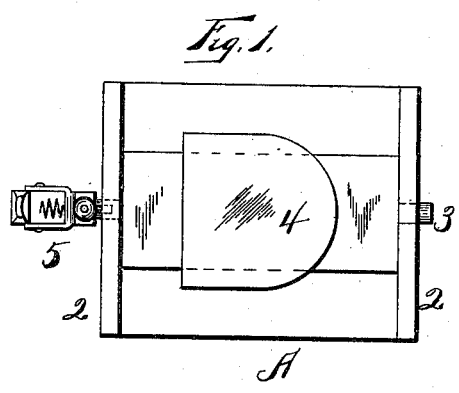
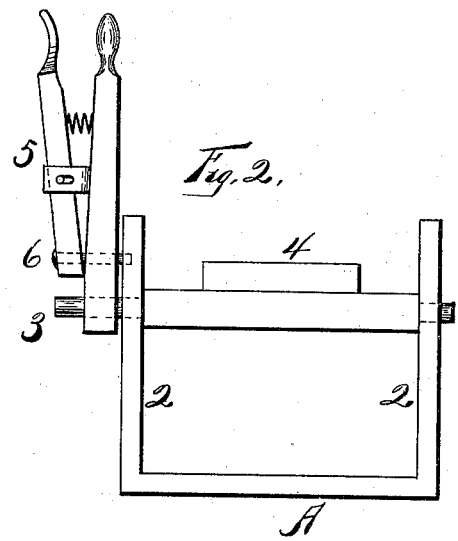
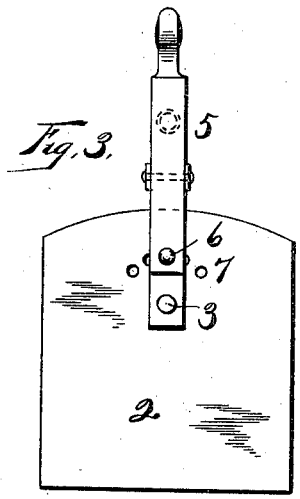
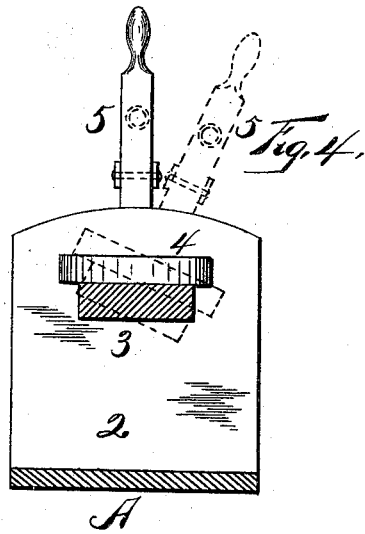
WITNESSES:
INVENTOR
George Eyer, Jr.
BY
Smith & Donison
ATTORNEYS.

UNITED STATES PATENT OFFICE.

GEORGE EYER, JR., OF LYONS, NEW YORK.

TILTING SEAT FOR VEHICLES.

SPECIFICATION forming part of Letters Patent No. 628,979, dated July 18, 1899.

Application filed March 4, 1899. Serial No. 707,749. (No model.)

*To all whom it may concern:*

Be it known that I, GEORGE EYER, Jr., of Lyons, in the county of Wayne, in the State of New York, have invented new and useful Improvements in Tilting Seats for Vehicles, of which the following, taken in connection with the accompanying drawings, is a full, clear, and exact description.

My invention relates to tilting seats for mowers, reapers, and other agricultural implements.

My object is to produce a seat adapted to be tilted, as when a machine is working on a side-hill, in order that the driver may more readily retain his seat, the tilting bringing the seat into a horizontal plane, comprising a suitable support, a seat-shaft journaled therein, a lever mounted upon said shaft in front of the rider and suitably engaging with the support, whereby the seat is securely supported in any position and can be shifted at any time by either hand, said lever standing in front of the rider and between his legs and operating also to aid him in keeping his seat and preventing him from being thrown off.

It is constructed as follows, reference being had to the accompanying drawings, in which—

Figure 1 is a top plan of the device ready to be mounted upon a machine. Fig. 2 is a side elevation thereof. Fig. 3 is a front elevation thereof. Fig. 4 is a vertical transverse section thereof.

A is a suitable base having standards 2, in which a rock-shaft 3 is suitably journaled, and 4 is a seat secured upon said shaft. Upon the front end of the shaft a shifting lever 5 is secured, the locking-pin 6 being adapted to engage with the recesses or holes 7 upon the front of the upright. This lever is directly in front of the rider, can be operated by him with either hand to tilt the seat in either direction, as shown by the dotted lines in Fig. 4, according to the incline of the machine, to keep the seat horizontal, rises between the legs of the rider and aids in holding him on the machine, and can be grasped at any time for that purpose.

Having described my invention, what I claim, and desire to secure by Letters Patent, is—

A tilting seat for a vehicle, comprising a support consisting of a base and standards thereon, a rock-shaft journaled in said standards, a seat secured upon said shaft, and a shifting lever secured upon said shaft in front of the rider, where it can be operated by either hand to tilt the seat, and having a locking-pin engaging with recesses in the front of said standard whereby the seat is supported steady in whatever position it may be, combined and operating together, substantially as shown and described.

In witness whereof I have hereunto set my hand this 16th day of January, 1899.

GEORGE EYER, JR.

Witnesses:
 HENRY M. WARNCKE,
 SAMUEL EYER.